US012794674B2

(12) United States Patent
Small et al.

(10) Patent No.: US 12,794,674 B2
(45) Date of Patent: Nov. 10, 2026

(54) SYSTEM AND METHOD TO PERFORM PASSWORDLESS AUTHENTICATION OPERATIONS OFFLINE

(71) Applicant: Cisco Technology, Inc., San Jose, CA (US)

(72) Inventors: Robert Jacob Linial Small, Ann Arbor, MI (US); Jordan David Neidlinger, Saline, MI (US); Joshua Michael King, Wichita, KS (US); Kevin J. Carpenter, Detroit, MI (US); Lisa Marie Selle, Rochester, MI (US); Dylan Miles Kite, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 19/081,177

(22) Filed: Mar. 17, 2025

(65) Prior Publication Data

US 2026/0280852 A1 Sep. 17, 2026

(51) Int. Cl.
*H04L 9/08* (2006.01)
*H04L 9/40* (2022.01)

(52) U.S. Cl.
CPC ........ *H04L 9/0822* (2013.01); *H04L 63/0807* (2013.01)

(58) Field of Classification Search
None
See application file for complete search history.

(56) References Cited

U.S. PATENT DOCUMENTS 8,595,810 B1 * 11/2013 Ben Ayed ........... H04L 63/0815 713/168
9,699,646 B2 * 7/2017 Poon ................... H04M 15/751
9,781,119 B2 * 10/2017 Matus ..................... G06F 21/30
(Continued)

OTHER PUBLICATIONS

Duo Security: "Duo Authentication for Windows Logon", Guide to Two-Factor Authentication, Retrieved from https://guide.duo.com/rdp#passwordless-os-logon-login on Jan. 16, 2025, pp. 1-24.
(Continued)

*Primary Examiner* — Teshome Hailu
*Assistant Examiner* — Mahabub S Ahmed
(74) *Attorney, Agent, or Firm* — Baker Botts L.L.P.

(57) ABSTRACT

A network element may be configured to perform one or more operations. The operations include establishing a short-range wireless communication link with an offline device and receiving, via the short-range wireless communication link, an encrypted message from the offline device. The encrypted message is encrypted using a first public key at the offline device. Further, the operations include decrypting, using a first private key corresponding to the first public key, the encrypted message, determining whether the authentication attempt is approved, generating an authentication approval including the single use value and an approval message configured to unlock the offline device in response to determining that the authentication attempt is approved, encrypting, using a second public key, the authentication approval, and transmitting, via the short-range wireless communication link, an encrypted version of the authentication approval to the offline device.

20 Claims, 6 Drawing Sheets

(56) References Cited

U.S. PATENT DOCUMENTS

| | | | | |
|---|---|---|---|---|
| 9,811,818 | B1 * | 11/2017 | Xing | A61B 10/0051 |
| 10,771,975 | B2 * | 9/2020 | Conrad | G07C 9/00309 |
| 11,212,675 | B2 * | 12/2021 | Hegde | H04L 63/0823 |
| 11,776,340 | B2 * | 10/2023 | Andrieiev | B60R 25/01 340/5.81 |
| 2007/0160017 | A1 * | 7/2007 | Meier | H04W 36/18 370/338 |
| 2010/0037057 | A1 * | 2/2010 | Shim | H04W 12/069 726/4 |
| 2017/0250974 | A1 | 8/2017 | Antonyraj et al. | |
| 2017/0257215 | A1 * | 9/2017 | Huang | H04L 67/141 |
| 2017/0357788 | A1 * | 12/2017 | Ledvina | H04W 12/06 |
| 2019/0190704 | A1 * | 6/2019 | Srivastava | H04L 63/0428 |
| 2019/0349652 | A1 * | 11/2019 | Greenewald | A61B 5/0015 |
| 2020/0169401 | A1 * | 5/2020 | Dooley | H04L 9/0822 |
| 2020/0403993 | A1 | 12/2020 | Alexander et al. | |
| 2023/0041669 | A1 * | 2/2023 | Zhang | H04W 12/069 |
| 2023/0140203 | A1 * | 5/2023 | Peng | G07C 9/00309 |
| 2023/0318855 | A1 * | 10/2023 | Nambula | H04L 9/085 713/156 |
| 2024/0106822 | A1 | 3/2024 | Kaditz et al. | |
| 2024/0126845 | A1 * | 4/2024 | Goodman | G06F 21/31 |
| 2025/0202882 | A1 * | 6/2025 | Griffin-Allwood | H04L 63/0435 |

OTHER PUBLICATIONS

Tecnics: “TecZERO: Passwordless Login For Desktops”, Retrieved from https://tecnics.com/products/teczero/ on Jan. 17, 2025, pp. 1-4.

* cited by examiner

SYSTEM AND METHOD TO PERFORM PASSWORDLESS AUTHENTICATION OPERATIONS OFFLINE

TECHNICAL FIELD

The present disclosure relates generally to network security, and more particularly, to a system and method to perform passwordless authentication operations offline.

BACKGROUND

In conventional systems, end users cannot securely authenticate into protected devices using a passwordless authentication when the protected devices are offline. In this regard, conventional systems do not allow, provide, and/or enable offline and passwordless authentication for protected devices. Further, these systems are susceptible to bad actors performing attacker in the middle attacks.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
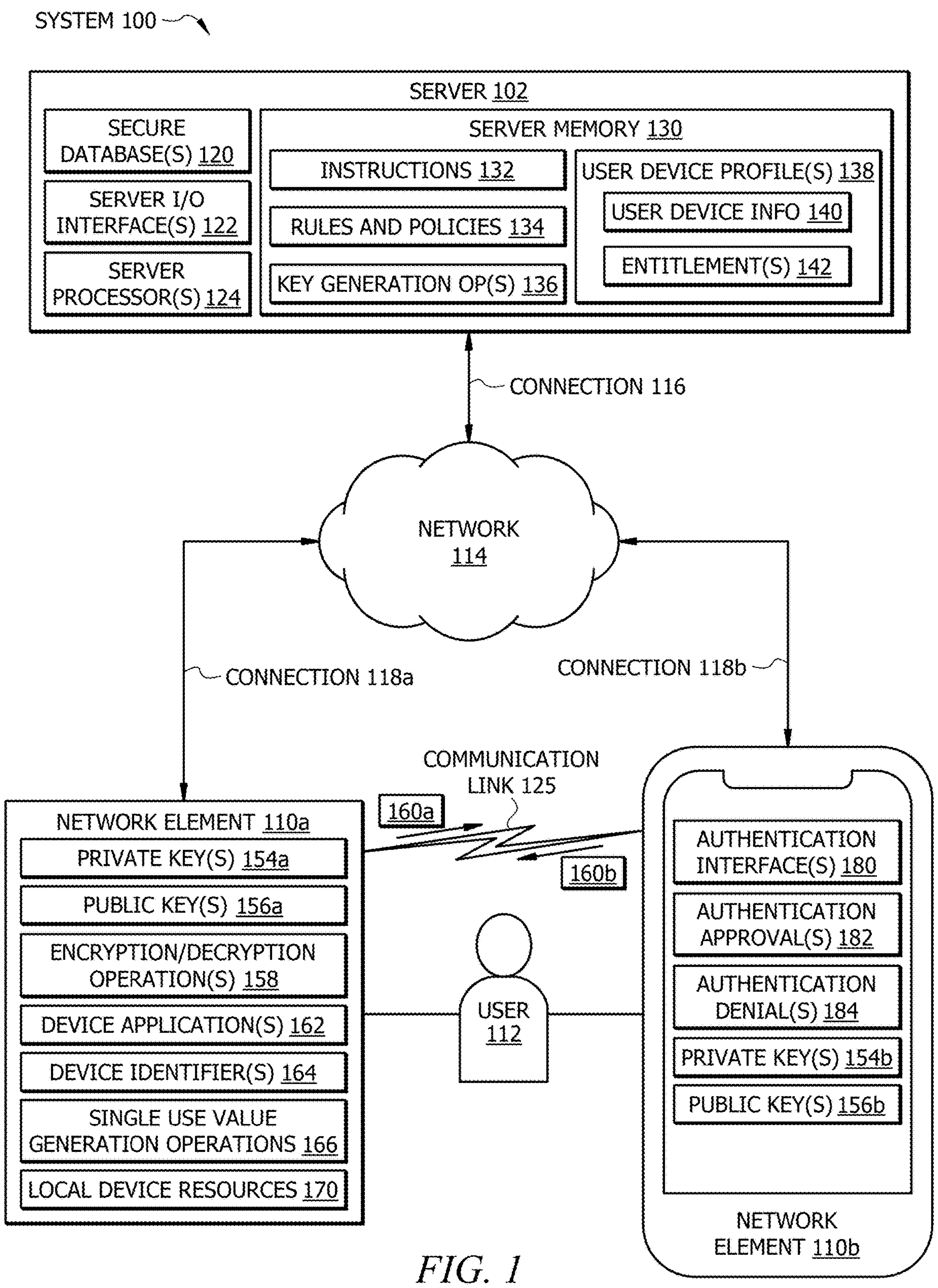
FIG. 1 illustrates a system to perform passwordless authentication operations offline, in accordance with certain embodiments.

According to an embodiment, a network element includes one or more processors and one or more computer-readable non-transitory storage media coupled to the one or more processors and including instructions that, when executed by the one or more processors, cause the network element to perform operations. The operations may include establishing a short-range wireless communication link with an offline device and receiving, via the short-range wireless communication link, an encrypted message from the offline device. The encrypted message may be a request to unlock the offline device. The encrypted message may include a single use value configured to identify an authentication attempt concatenated with a network element identifier associated with the network element and a device identifier associated with the offline device. The encrypted message may be encrypted using a first public key at the offline device. Further, the operations may include decrypting, using a first private key corresponding to the first public key, the encrypted message, determining whether the authentication attempt is approved, generating an authentication approval including the single use value and an approval message configured to unlock the offline device in response to determining that the authentication attempt is approved, encrypting, using a second public key, the authentication approval, and transmitting, via the short-range wireless communication link, an encrypted version of the authentication approval to the offline device. The encrypted version of the authentication approval may be configured to be decrypted using a second private key corresponding to the second public key. The offline device may be configured to unlock in response to successfully decrypting the authentication approval.

In accordance with certain embodiments, the first private key is unique to the network element and the second private key is unique to the offline device. In some embodiments, the single use value may be included in an electronic nonce. In other embodiments, the single use value may be included in an electronic token.

In accordance with certain embodiments, the offline device is configured to unlock in response to successfully decrypting the authentication approval and determining that the authentication approval includes the single use value. In some embodiments, the short-range wireless communication link is established using a wireless low-energy technology that allows the network element and the offline device to communicate with each other over a short distance using short-wavelength radio waves. In other embodiments, the network element and the offline device are only communicatively coupled to one another.

In accordance with certain embodiments, the operations further include establishing an additional short-range wireless communication link with an additional offline device and receiving, via the additional short-range wireless communication link, an additional encrypted message from the additional offline device. The additional encrypted message may be an additional request to unlock the offline device. The additional encrypted message may include an additional single use value configured to identify an additional authentication attempt concatenated with the network element identifier associated with the network element and an additional device identifier associated with the additional offline device. The additional encrypted message may be encrypted using a third public key at the additional offline device. Further, the operations may include decrypting, using a third private key corresponding to the third public key, the additional encrypted message, determining whether the additional authentication attempt is approved, generating an authentication denial configured to maintain the offline device locked in response to determining that the additional authentication attempt is not approved, and transmitting, via the additional short-range wireless communication link, the authentication denial to the offline device. The offline device may be configured to remain locked in response to receiving the authentication denial.

According to another embodiment, a method includes establishing a short-range wireless communication link with an offline device and receiving, via the short-range wireless communication link, an encrypted message from the offline device. The encrypted message may be a request to unlock the offline device. The encrypted message may include a single use value configured to identify an authentication attempt concatenated with a network element identifier associated with the network element and a device identifier associated with the offline device. The encrypted message may be encrypted using a first public key at the offline device. Further, the method may include decrypting, using a first private key corresponding to the first public key, the encrypted message, determining whether the authentication attempt is approved, generating an authentication approval including the single use value and an approval message configured to unlock the offline device in response to determining that the authentication attempt is approved, encrypting, using a second public key, the authentication approval, and transmitting, via the short-range wireless communication link, an encrypted version of the authentication approval to the offline device. The encrypted version of the authentication approval may be configured to be decrypted using a second private key corresponding to the second public key. The offline device may be configured to unlock in response to successfully decrypting the authentication approval.

According to yet another embodiment, one or more computer-readable non-transitory storage media embody instructions that, when executed by a processor, cause the processor to perform operations. The operations may include establishing a short-range wireless communication link with an offline device and receiving, via the short-range wireless communication link, an encrypted message from the offline device. The encrypted message may be a request to unlock the offline device. The encrypted message may include a single use value configured to identify an authentication attempt concatenated with a network element identifier associated with the network element and a device identifier associated with the offline device. The encrypted message may be encrypted using a first public key at the offline device. Further, the operations may include decrypting, using a first private key corresponding to the first public key, the encrypted message, determining whether the authentication attempt is approved, generating an authentication approval including the single use value and an approval message configured to unlock the offline device in response to determining that the authentication attempt is approved, encrypting, using a second public key, the authentication approval, and transmitting, via the short-range wireless communication link, an encrypted version of the authentication approval to the offline device. The encrypted version of the authentication approval may be configured to be decrypted using a second private key corresponding to the second public key. The offline device may be configured to unlock in response to successfully decrypting the authentication approval.

Technical advantages of certain embodiments of this disclosure may include one or more of the following. Certain embodiments described herein provide offline and passwordless authentication operations between two devices while maintaining one or more expected security levels. In one or more embodiments, certain embodiments include authenticating operations in which server communications are omitted. In particular, an authentication process may be performed to access resources in a device while the device is offline (e.g., not connected to any servers) using an additional device connected within a short distance. Herein, the device may be configured to verify authenticity of a user's access without requiring usage of a password while both devices are completely offline. All communications may be encrypted between the devices using one or more short-range wireless communication protocols. Herein, received communications are decrypted at each device using private keys corresponding to public keys in corresponding transmission devices. Since these private keys are not exportable from the user device, the use of these private keys to sign data guarantees that signing happened on that device. This disclosure describes systems and methods for leveraging the hardware-based device identity for passwordless and offline authentication procedures.

Certain systems and methods described herein are integrated into a practical application of increasing processing speed and reducing memory usage in the system. Specifically, certain systems and methods reduce or eliminate delays or data congestions caused by attacks involving network applications associated with one or more applications. Further, certain systems and methods are integrated into a practical application of reducing an overall amount of network traffic due to pausing of application transmissions and operations resulting from attacker interruptions. This reduces the traffic on the network and helps alleviate network bottlenecks that could otherwise occur during operations requiring multiple-layer application asset operations such as those involving Artificial Intelligence (AI) and Machine Learning (ML) procedures. Other methods of authentication (e.g., WebAuthn) still rely on server connectivity to perform authentication of user credentials, whereas certain embodiments described herein do not rely on any server connectivity while successfully completing authentication operations.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods to perform passwordless authentication operations offline. In one or more embodiments, users logging into secured devices (e.g., laptop or desktop), may be requested to perform one or more authentication operations. A log in process may be performed online or offline. Further, the log in process may be performed using a password and/or without a password. In one or more embodiments, the systems and methods may be configured to successfully enable a secured process for authenticating the identity of a user. Herein, the systems and methods may be configured to intercept requests for authentication operations in a secured device and route the request to authenticate the identity of the user without using passwords (which may be fished) while the secured device is offline.

In one or more embodiments, to successfully perform authentication operations without talking to a server, the secured device may leverage authentication via a trusted device. Herein, the secured device may initiate a communication link with a trusted device that is in close proximity with the secured device. The trusted device and the secured device may be only communicatively coupled to one another.

Figure 2:
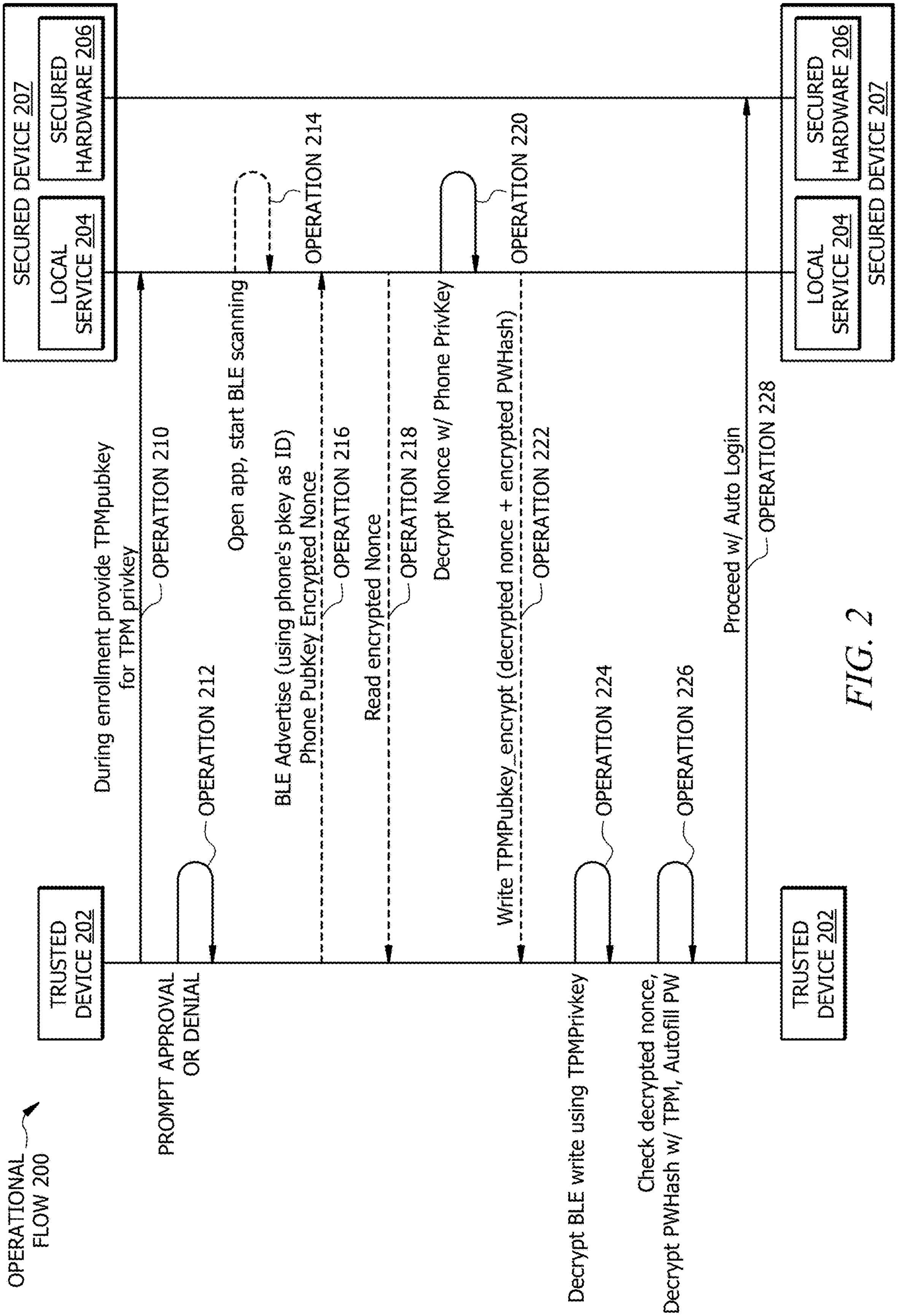
FIG. 2 illustrates a first operational flow that may be used by the system of FIG. 1 to perform passwordless authentication operations offline, in accordance with certain embodiments.
Figure 3:
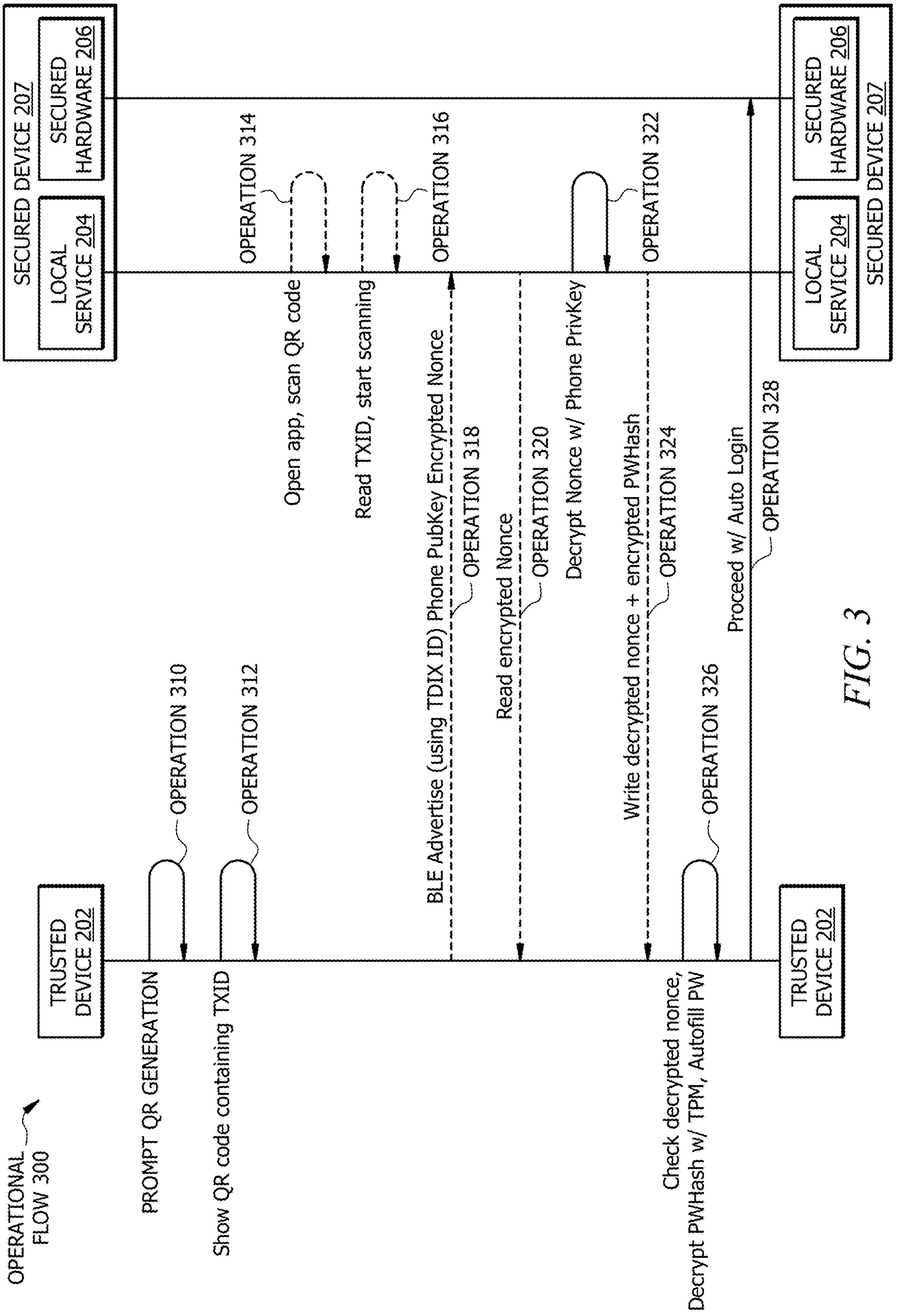
FIG. 3 illustrates a second operational flow that may be used by the system of FIG. 1 to perform passwordless authentication operations offline, in accordance with certain embodiments.
Figure 4A:
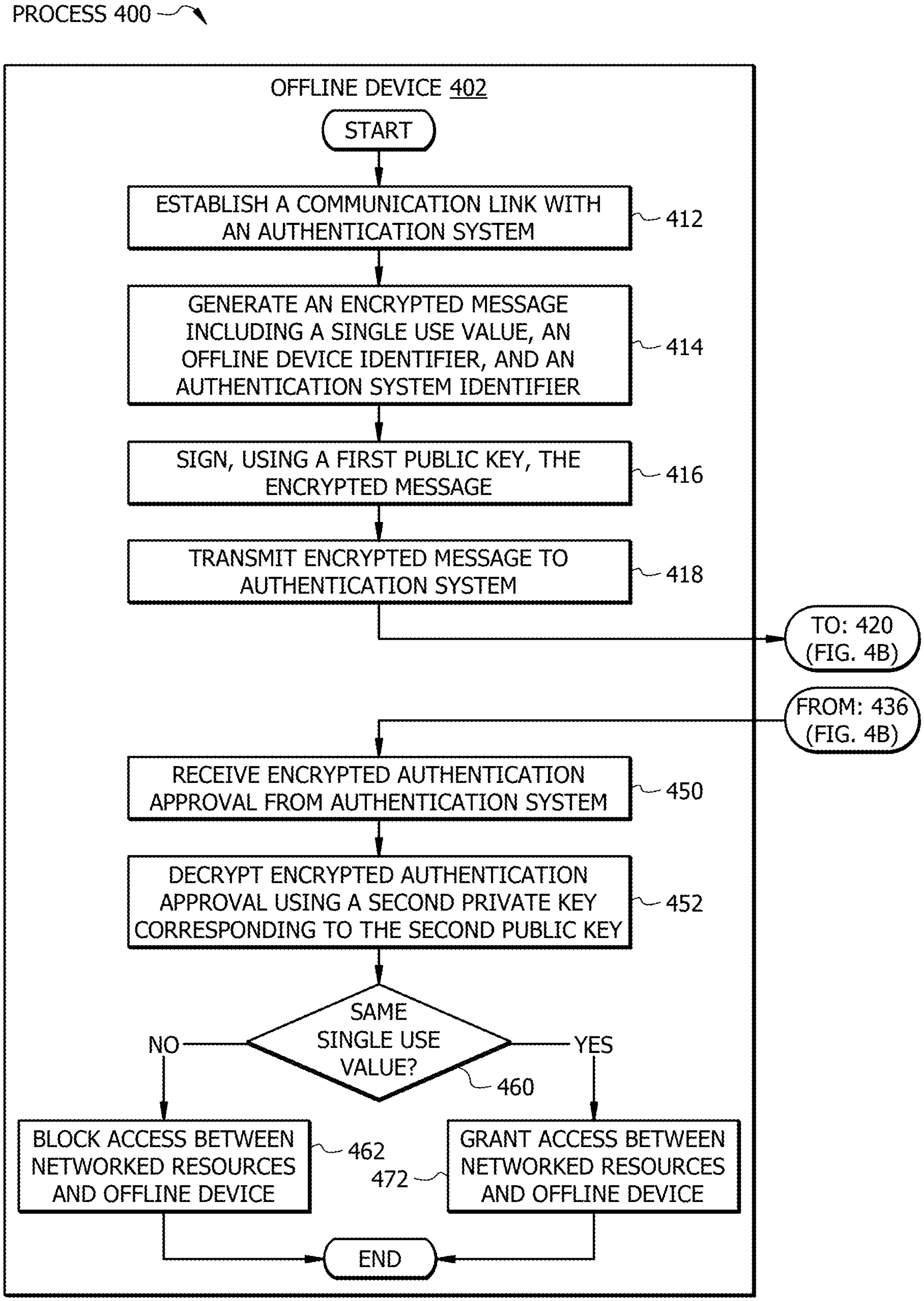
FIGS. 4A and 4B illustrate a method for performing passwordless authentication operations offline, in accordance with certain embodiments.
Figure 4B:
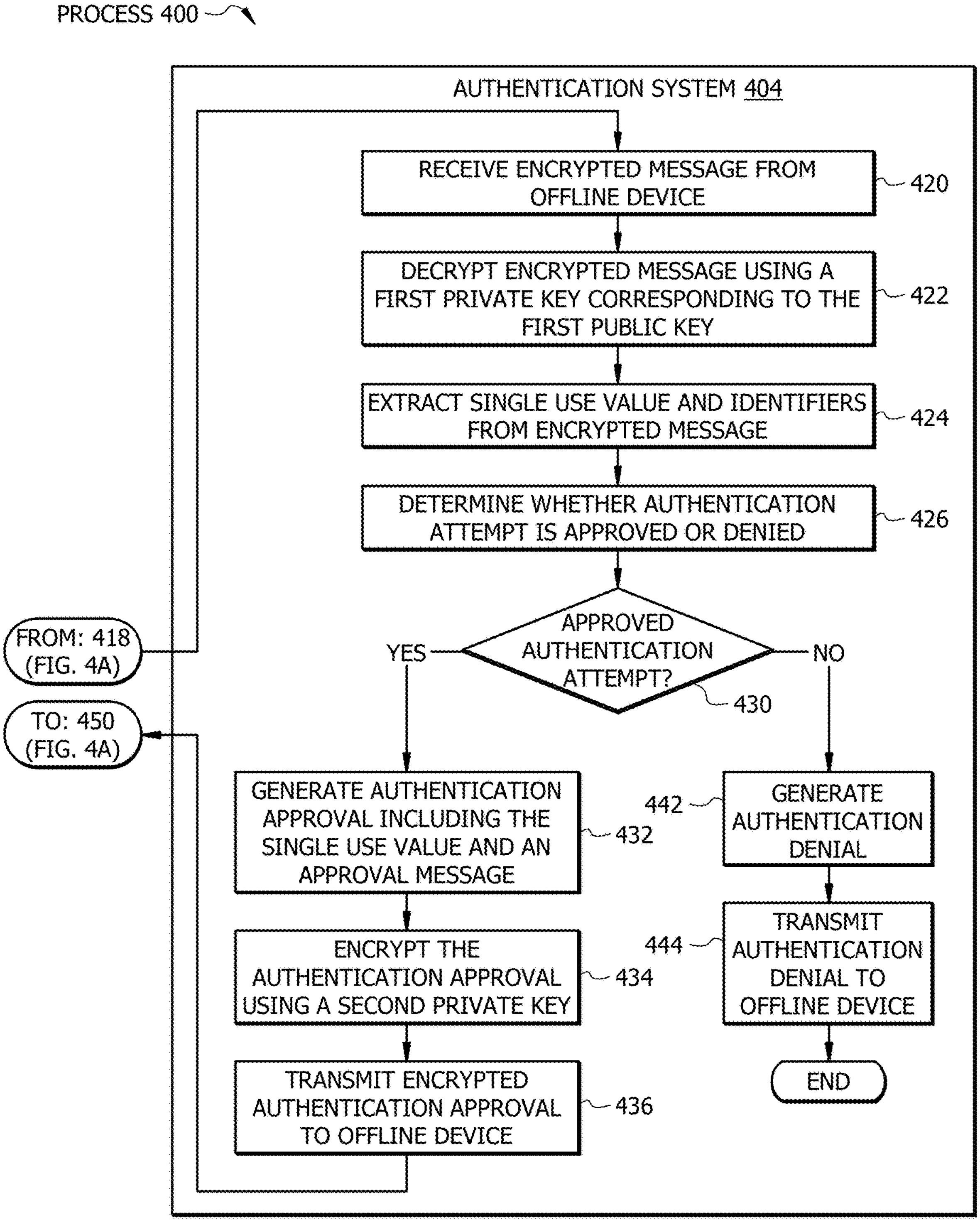
Figure 5:
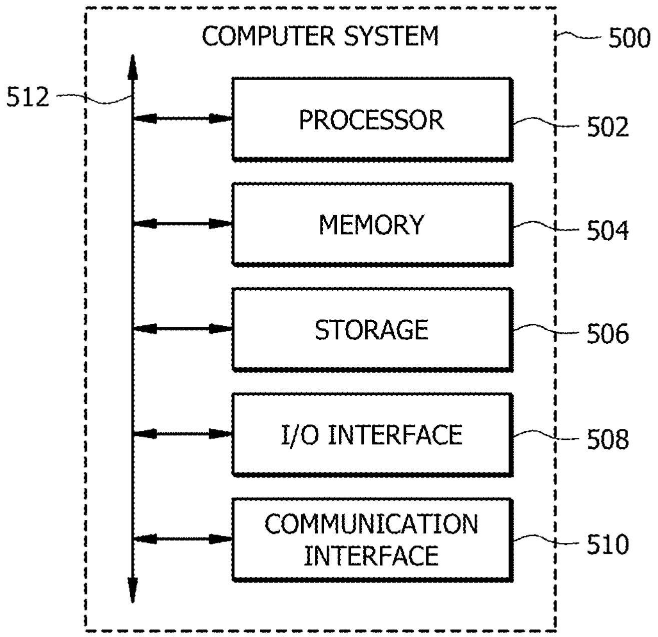
FIG. 5 illustrates a computer system that may be used by the systems and methods described herein, in accordance with certain embodiments.

FIG. 1 illustrates a system 100 in which a short-range hardware-based device identity is leveraged for passwordless authentication operations offline. FIGS. 2 and 3 illustrate respective operational flow 200 and operational flow 300 in which the system 100 of FIG. 1 is configured to implement passwordless authentication operations offline. FIGS. 4A and 4B illustrate a process 400 to perform the operational flow 200 of FIG. 2 and the operational flow 300 of FIG. 3. FIG. 5 illustrates a computer system 500 that may be configured to perform one or more operations described in reference to FIGS. 1-4.

FIG. 1 illustrates a system 100 to perform passwordless authentication operations offline, in accordance with certain embodiments. System 100 or portions thereof may be associated with an entity, which may include any entity, such as a business, company, or enterprise, which uses triggers and event metadata to join meetings. In certain embodiments, the entity may be associated with a web conferencing organization, a telecommunications company, and the like. The components of system 100 may include any combination of hardware, firmware, and software. For example, the components of system 100 may use one or more elements of the computer system of FIG. 5. In the illustrated embodiment of FIG. 1, system 100 includes a server 102 and one or more network elements 110 (shown as the network element 110*a* and a network element 110*b*) that may be communicatively coupled via a network 114. The server 102 is shown communicatively connected to the network 114 via a connection 116. The network elements 110 are shown communicatively connected to the network 114 via the connections 118 (shown as the connection 118*a* for the network element 110*a* and a connection 118*b* for the network element 110*b*).

In one or more embodiments, the network elements 110 are in complete disconnection from the server 102. Herein, one of the network elements 110 may not be in communication with the network 114 while one or more of the network elements 110 are offline. The one of the network elements 110 may be in at least partial communication with the network 114 while one or more of the network elements 110 are offline.

In some embodiments, the network elements 110 may include access to at least one secure hardware. The one or more secure hardware may include the one or more wired connections that share an internal bandwidth for data packet transmissions inside the server 102 with the server memory 130. The at least one secure hardware may be configured with a buffering capacity and a memory speed. The buffering capacity may indicate a buffering capacity (in bytes) that the storage and databases are capable of handling.

In some embodiments, the at least one secure hardware may be configured to store one or more data elements and/or record elements. The secure hardware may be configured to store encrypted data, secured data elements, and/or tokens representative of actual data.

Network 114 of system 100 is any type of network that facilitates communication between components of system 100. Network 114 may connect one or more components of system 100. One or more portions of network 114 may include an ad-hoc network, the Internet, an intranet, an extranet, a portion of a Public Switched Telephone Network (PSTN), a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a cellular telephone network, a Digital Subscriber Line (DSL), an Multiprotocol Label Switching (MPLS) network, a 3G/4G/5G/6G network, a Long Term Evolution (LTE) network, a cloud network, a combination of two or more of these, or other suitable types of networks. Network 114 may include one or more different types of networks. Network 114 may be any communications network, such as a private network, a public network, a connection through the Internet, a mobile network, a Wi-Fi network, and the like. Network 114 may include a core network, an access network of a service provider, an Internet service provider (ISP) network, and the like. One or more components of system 100 may communicate over network 114.

In the illustrated embodiment of FIG. 1, network 114 includes a PSTN. The PSTN may be a combination of telephone networks that provide infrastructure and services for public telecommunication. The PSTN may be an aggregate of circuit-switched telephone networks that are interconnected by switching centers. The PSTN may include telephone lines, fiber optic cables, microwave transmission links, cellular networks, communications satellites, undersea telephone cables, switching centers, and the like. In certain embodiments, the PSTN may be associated with one or more PSTN numbers. The PSTN numbers are telephone numbers connected to PSTN.

Network 114 may include one or more nodes. Nodes may be connection points within network 114 that receive, create, store and/or send data along a path. Nodes may include one or more redistribution points that recognize, process, and forward data to other nodes of network 114. Nodes may include virtual and/or physical nodes. For example, nodes may include one or more physical devices, virtual machines, bare metal servers, and the like. As another example, nodes may include data communications equipment such as computers, routers, servers, printers, workstations, switches, bridges, modems, hubs, and the like. In the illustrated embodiment of FIG. 1, nodes include the server 102 and the network elements 110.

The network elements 110 of system 100 may be any electronic equipment configured to receive, create, process, store, and/or communicate information. The network elements 110 may include one or more portable devices (e.g., mobile phones (e.g., smartphones), laptop computers, tablets, personal digital assistants (PDAs), tablets, wearable devices, and the like), vehicular communication systems, and the like. In certain embodiments, network elements 110 include an electronic display screen. For example, network elements 110 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. The network elements 110 may be located in any suitable location to receive and communicate information to user 112 of system 100.

User 112 of system 100 is a person who utilizes network elements 110. User 112 may be a local user, a remote user, an administrator, a customer, a company, a combination thereof, and the like. In certain embodiments, user 112 is associated with one or more accounts. User 112 may be associated with an account name, a username, a login name, a screen name, one or more passwords, a user profile, and the like. In certain embodiments, user 112 utilizes one or more applications downloaded to network elements 110.

Network elements 110 of system 100 run one or more applications. Applications are computer software packages that perform specific functions for user 112 or for another application. Each application may be self-contained or may be a group of programs. In the illustrated embodiment of FIG. 1, the applications running on network elements 110 include device applications 162. The network elements 110 may include one or more private keys 154 (shown as private keys 154*a* and private keys 154*b*), one or more public keys 156 (shown as public keys 156*a* and public keys 156*b*), one or more encryption/decryption operations 158, the one or more device applications 162, one or more device identifiers 164, one or more single use value generation operations 166, one or more local device resources 170, one or more authentication interfaces 180, one or more authentication approvals 182, and/or one or more authentication denials 184.

The one or more private keys 154 (shown as private keys 154*a* and private keys 154*b*) and the one or more public keys

156 (shown as public keys 156*a* and public keys 156*b*) may be one or more passphrases, encryption keys, passwords, passkeys, access commands, decryption parameters, and/or pin codes configured to enable decryption, encryption, and/or combination of one or more data elements and/or one or more data records. The one or more private keys 154 (shown as private keys 154*a* and private keys 154*b*), may be unique keys stored in a memory and corresponding to one or more specific public keys 156. The one or more public keys 156 (shown as public keys 156*a* and public keys 156*b*), may be provided and/or administered by the server 102 at a time when the network elements 110 are online.

The one or more encryption/decryption operations 158 may be one or more encryption operations and/or one or more decryption operations. The encryption operations may include safeguarding information using one or more of the private keys 154, the public keys 156, and/or additional key elements, preventing access to information by scrambling, shifting, altering, adding, removing, and/or processes to protect information. The decryption operations may include safely retrieving information using one or more of the private keys 154, the public keys 156, and/or additional key elements, obtaining controlled access to information by unscrambling, reorganizing, rearranging, adding, removing, and/or processes to access information.

The one or more device identifiers 164, may be one or more alphanumeric bit strings configured to reference one or more aspects of a given server 102 communicatively coupled to the network elements 110, one or more specific network elements 110, and/or one or more communication types. The one or more single use value generation operations 166 may be one or more operations configured to generate one or more single use values. The single use values may be one or more numeral confirmation values that the network elements 110 are configured to use for confirmation of data exchanges. For example, the network element 110*a* may create a single use value and include this value in an encrypted message 160*a* transmitted to network element 110*b*. Further, the network element 110*b* may perform one or more operations based on contents in the encrypted message 160*a*. After completing one or more operations, the network element 110*b* may be configured to transmit one or more additional encrypted messages 160*b* in response to the network element 110*a*. The additional encrypted message 160*b* may include the single use value. After decrypting the additional encrypted message 160*b*, the network element 110*a* may be configured to verify a source of the encrypted message 160*b* by confirming the content (e.g., value and/or meaning) of the single use value. The single use values may be a nonce (e.g., a small reference value), a value token, and/or a confirmation parameter among others.

The one or more local device resources 170 may be at least a portion of systems and/or devices associated with performing one or more device applications 162. In some embodiments, the local device resources 170 may be cloud resources, power resources, memory resources, and/or processing resources that are consumed in attempts to access services and/or applications in a given network element 110. In other embodiments, the local device resources 170 may be audio, visual, and/or sound data configured to be packaged as data streamed for playback. For example, the local device resources 170 may include access to one or more applications in a network. In another example, the local device resources 170 may include access to one or more databases and/or data storages associated with the server 102.

The one or more authentication interfaces 180 may be one or more interfaces of the network elements. The interfaces may be configured to perform one or more interfacing operations. The one or more authentication interfaces 180 may be one or more terminals configured to enable interactivity between the user 112 and a corresponding network element 110. The authentication interfaces 180 may include interfaces such as those described in reference to the server input/output (I/O) interfaces 122. For example, the authentication interfaces 180 may include a screen where the user 112 may be configured to select responses to one or more operation prompts presented over time.

The one or more authentication approvals 182 may be one or more approvals referencing that an authentication operation (e.g., requested by another network element 110) is approved. The approvals may be a trigger generated autonomously by a network element 110 and/or the user 112 via the network element 110. The one or more authentication denials 184 may be one or more denials referencing that an authentication operation (e.g., requested by another network element 110) is denied. The denials may be a trigger generated autonomously by a network element 110 and/or the user 112 via the network element 110.

Device application 162 of system 100 is software (e.g., a computer program) that performs an action set. For example, device application 162 may perform an action set in response to receiving instructions 132 from the server 102. In certain embodiments, device application 162 is a phone application.

In certain embodiments, the network elements 110 may be configured to establish a communication link 125. The communication link 125 may be established using one or more wireless and/or wired connections between the network elements 110. The communication links 125 may include one or more short-range wireless communication connections (e.g., Bluetooth® Low Energy (BLE) and/or other short-range communication procedures). The network elements 110 may be configured to exchange one or more messages 160 (e.g., one or more encrypted messages 160*a* and encrypted messages 160*b*) via the communication link 125. In the embodiments of FIG. 1, the messages 160 may be one or more communication transmissions between the network elements 110 and one or more additional network devices. The messages 160 may be encrypted communications and/or signaling including one or more data elements and/or data records described in reference to FIGS. 1-5.

Server 102 of system 100 is computer hardware or software (e.g., a computer program) that provides functionality for other programs or devices. In the illustrated embodiment of FIG. 1, server 102 provides services for network elements 110. For example, server 102 may obtain, organize, and process information from the network elements 110. As another example, server 102 may communicate information to and/or receive information from device applications 162 of network elements 110. In some embodiments, server 102 is a cloud server.

In the example of FIG. 1, the server 102 includes one or more secure databases 120, one or more server I/O interfaces 122, one or more server processors 124, and at least one server memory 130. The server memory 130 may be operable to store one or more instructions 132, one or more rules and policies 134, one or more key generation operations 136, and one or more user device profiles 138 in which user device information 140 is associated with one or more entitlements 142.

In other embodiments, the server 102 may take any suitable physical form. Where appropriate, the server 102 may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more operations of one or more methods described or illustrated herein. As an example, and not by way of limitation, the server 102 may perform in real-time and/or in batch mode one or more operations of one or more methods and/or one or more communication protocols described or illustrated herein. The server 102 may perform at different times and/or at different locations one or more operations of one or more methods described or illustrated herein, where appropriate.

In one or more embodiments, the server 102 may include one or more I/O devices, where appropriate. The one or more I/O devices may enable communication between the network element 110 and the server 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any corresponding suitable server I/O interfaces 122. Where appropriate, the server I/O interfaces 122 may include one or more devices or software drivers enabling the one or more server processors 124 to drive one or more of the I/O devices. Although this disclosure describes and illustrates particular server I/O interfaces 122, this disclosure contemplates any suitable number of server I/O interfaces 122.

In one or more embodiments, the server I/O interfaces 122 may include a communication interface including hardware, software executed by hardware, or a combination of both providing one or more interfaces for communication (such as, for example, packet-based communication) between the server 102, the one or more network elements 110, the network 114, or one or more additional networks. This disclosure contemplates any suitable network and any suitable corresponding communication interface. The server 102 may include any suitable communication interface for any of these networks, where appropriate. Although this disclosure describes and illustrates the server I/O interfaces 122 including particular communication interfaces, this disclosure contemplates any suitable communication interface.

In some embodiments, the server I/O interfaces 122 may include access to the one or more secure databases 120 communicatively coupled to the one or more server processors 124 and the server memory 130. The one or more secure databases 120 may include the one or more wired connections that share an internal bandwidth for data packet transmissions inside the server 102 with the server memory 130. The one or more secure databases 120 may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may include instructions and data memory for the one or more server processors 124.

In particular embodiments, the server I/O interfaces 122 may include a transceiver (e.g., transmitter, receiver, or a combination of both) configured to implement one or more wireless or wired connectivity protocols. In this regard, the transceiver may include antennas including hardware configured to establish one or more communication links (e.g., established via the connection 116 or the connections 118) between the server 102 and one or more of the network elements 110. Although this disclosure describes and illustrates the connection 118 and the connections 116, this disclosure contemplates any arrangement of channels for information exchange.

In some embodiments, the one or more server processors 124 include hardware for executing instructions (e.g., instructions 132), such as those making up a computer program. As an example, and not by way of limitation, to execute instructions, the one or more server processors 124 may retrieve (or fetch) the instructions 132 from an internal register, an internal cache, or the server memory 130; decode and execute them; and then write one or more results to an internal register, an internal cache, or the server memory 130.

In one or more embodiments, the one or more server processors 124 include hardware, software executed by hardware, or a combination of both, configured to reprovision the network elements 110 to perform one or more tasks. The one or more server processors 124 may be one or more routing devices configured to route resources in the network 114 to additional network elements 110. In some embodiments, the one or more server processors 124 may be included on a same card or die. In this regard, the one or more server processors 124 may be configured to determine types of data exchanged by the network elements 110. The types of data may include sound, video, or informational details associated with any of the network elements 110.

In other embodiments, the server processor may comprise a processing engine. The processing engine may be software executed by hardware and configured to dynamically aid the network elements 110 to maintain synchronization parameters during synchronization operations. The processing engine may be implemented by the one or more server processors 124 operating as specialized hardware accelerators. The processing engine may be configured to implement networking-specific processing tasks in custom logic and achieve better performance than typical software implementations. For example, the processing engine may be lookup engines (e.g., using specialized logic), cryptographic coprocessors, content inspection engines, and the like. In some embodiments, the one or more processing engines configured to operate the secure databases 120 via execution of one or more of the instructions 132.

In one or more embodiments, the server processor 124 is hardware, software executed by hardware, or a combination of both configured to regulate the types of data shared among two or more of the network elements 110 and/or between the server 102 and one or more of the network elements 110. In some embodiments, the server 102 may assist in establishing a communication link between any two or more network elements 110 and/or between the server 102 and one or more of the network elements 110. In implementing the communication links, the server 102 may monitor data shared by each of the network elements 110 and control that specific types of data are reciprocated to at least one of the network elements 110. In this regard, the server processor 124 may regulate the types of data presented at a given network elements 110 based at least in part upon the types of data that the given user device is configured to share. In some embodiments, the server processor 124 may be configured to schedule timings for transmissions of multiple network elements 110 to evaluate the data transmitted. In other embodiments, the server processor 124 may be configured to determine multiple data exchange settings (e.g., communication preferences of a given network elements 110) and determine whether the given network elements 110 is configured to share a specific type of data. The server processor 124 may include a security chipset configured to establish one or more physical gates/firewalls at the server 102 or at one or more of the network elements 110, a wireless chipset configured to provide wireless connectivity capabilities, and a routing chipset configured to regulate data exchanging capabilities by reducing or increasing access to specific types of data. In other embodiments, the security chipset, the wireless chipset, and the routing chipset may be combined into a same chipset sharing common memory resources and processing resources.

In one or more embodiments, the secure databases 120 may be configured to store one or more data elements and/or record elements. The secure databases 120 may be secured with multiple firewalls and/or authentication protocols. The secure databases 120 may be configured to store encrypted data, secured data elements, and/or tokens representative of actual data.

In one or more embodiments, the server memory 130 includes mass storage for data or instructions. In one or more embodiments, the server memory 130 includes a main memory for storing the instructions 132 for the one or more server processors 124 to execute or data for the one or more server processors 124 to operate on. In one or more embodiments, the server memory 130 includes commands or data associated with one or more specific applications in addition or as part of the instructions 132.

The key generation operation 136 may be one or more operations in which the server 102 is configured to coordinate key generation for two or more network elements 110. The key generation operation 136 may be configured to coordinate private keys 154 and public keys 156 in the network elements 110 during an online stage. The online stage may include any period of time in which the network elements 110 are communicatively coupled to the server 102. In some embodiments, the server 102 may be configured to generate key pairs for each of the network elements 110 in accordance with a security level. For example, in a set of security levels including five security levels, a security level five is determined to be the highest security level. In this example, keys corresponding to security level one may be shorter than keys corresponding to security level five.

In some embodiments, the key pairs generated via the key generation operation 136 may include at least one private key 154 and at least one public key 156. The key pairs may be divided and distributed between two or more network elements 110 based on whether certain network elements 110 are expected to communicate with one another. For example, the server 102 may be configured to distribute a private key 154 to a first network element 110 and a public key 156 to a second network element 110 configured to communicate with the first network element 110. If there are multiple network elements 110, the server 102 may be configured to create multiple public keys 154 an/or multiple private keys 154 to distribute among the two or more network elements 110.

The one or more user device profiles 138 may be configured to provide access to configuration parameters for the network elements 110 to operate (e.g., perform one or more tasks) in the network 114. The user device information 140 may be one or more collected information associated with a specific user 112 and/or a specific network element 110. The user device information 140 may be information, data elements, and/or data records representative of IDs associated with users 112 and/or network elements 110. The user device information 140 may be configuration information and/or operational parameters collected in accordance with one or more communication protocols. The user device information 140 may include information input by one or more of the users 112 via one or more of the network elements 110, one or more tracked operations associated with a given user 112 within a service. The entitlements 142 may be configured to provide one or more connectivity allowances to the network elements 110. For example, in accordance with one of the user device profiles 138 corresponding to the network element 110*b*, the network element 110*b* may be a desktop computer or communication terminal configured to communicate and route signaling among some of the additional network elements 110. In this regard, the entitlements 142 associated with a corresponding user device profile 138 of the network element 110*b* may indicate that the network element 110*b* is allowed to communicate with one or more components in the network 114 (e.g., core network components or servers including specific network functions (NF)) to communicate and route signaling.

In some embodiments, the multiple rules and policies 134 may be information commanding rules and/or operations of the system 100. The rules and policies 134 may be updated dynamically or periodically over time. For example, the rules and policies 134 may provide guidelines to access, receive and transmit information using the server I/O interfaces 122. In other embodiments, the rules and policies 134 may be procedure or operational guidelines predefined by one or more organizations associated with the server 102. The rules and policies 134 may be one or more operation preferences that may include information associated with, or updated by, the network elements 110. The rules and policies 134 may be predefined data exchange parameters set in accordance with one or more operation preferences. For example, an organization may predefine in the rules and policies 134 of a given user device profile 138 that a given network elements 110 is configured to exchange both video and sound during a communication exchange. Further, the rules and policies 134 may be dynamically modified data exchange parameters by a user 112 associated with a given network elements 110. For example, a user 112 may set the rules and policies 134 to transmit specific data types during a communication exchange.

In some embodiments, the network elements 110 represent devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), ear devices, and the like), and so forth. The network elements 110 may include Internet of Things (IoT) devices or equipment, such as agricultural equipment (e.g., livestock tracking and management systems, watering devices, unmanned aerial vehicles (UAVs), and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

In one or more embodiments, during an online stage where the server 102 is communicatively coupled to the one or more network elements 110, the server 102 may be configured to obtain information that two network elements 110 are associated with a same user 112. Then, the server 102 may be configured to perform one or more key generation operations 136 in which private keys 154 and public keys 156 are generated for the network elements 110. For example, private keys 154*a* may be generated for the network element 110*a* corresponding to public keys 156*b* in the network element 110*b* and private keys 154*b* may be generated for the network element 110*b* corresponding to public keys 156*a* in the network element 110*a*. Herein, using public-private key cryptography to encrypt data communication exchanges, the system 100 is configured to inhibit and/or eliminate adverse impacts caused by cyber-attacks that may reach information exchanged between the network element 110*a* and the network element 110*b* because the information is hidden from any bad actor attempting to intercept any communication exchanges.

In some embodiments, during an offline stage where the server 102 is not communicatively coupled to the one or more network elements 110, the server 102 may be configured to be completely uncommunicated (e.g., directly, and indirectly) from the network elements 110. Herein, the user 112 may attempt to perform one or more authentication operations in which the user 112 is allowed access to local device resources 170 in one of the network elements 110. In the example of FIG. 1, the user 112 may attempt to access local device resources 170 in the network element 110*a* while both the network element 110*a* and the network element 110*b* are offline. Further, offline may refer to the network element 110*a* and the network element 110*b* being communicatively coupled to only one another and/or these network elements 110 being uncommunicated from the server 102. In this scenario, the network element 110*a* may be configured to determine that there are no communications with the server 102. At this stage, the network element 110*a* may be configured to trigger connectivity with the network element 110*b* acting as a trusted device 202. As it will be explained in reference to FIGS. 2 and 3, the trusted device 202 may be a device previously associated with the user 112 and determined by the server 102 to be trustworthy. During the online stage, the server 102 and the network elements 110 may be preconfigured with private keys 154 and public keys 156.

In one or more embodiments, the network element 110*a* may be configured to broadcast a need for validation in a small area as part of the authentication operations. The network element 110*a* may be configured to broadcast in the small area using a short-range wireless protocol (e.g., such as BLE). In some embodiments, the network element 110*b* may be configured to receive the broadcast request and establish the communication link 125 with the network element 110*a*. In other embodiments, the network element 110*b* may be already engaged from a previous session and the communication link 125 may be previously established. The authentication operations may be part of a process to access local device resources 170 in the network element 110*a* and/or unlock the network element 110*a* (e.g., log in).

After establishing the communication link 125, the network element 110*a* may be configured to transmit an encrypted message 160*a* to the network element 110*b*. To create the encrypted message 160*a*, the network element 110*a* may be configured to create a single use value and encrypt this value in a request message along a public key 156 and one or more device identifiers 164. In turn, the network element 110*b* may be configured to decrypt the encrypted message 160*a* using a private key 154 corresponding to the public key 156 that was used to encrypt the message 160*a*. Herein, the network element 110*b* may be configured to perform one or more authentication operations in which the network element 110*b* determines whether the network element 110*a* is authorized to be unlocked. In response to determining that the network element 110*a* is authorized to be unlocked, the network element 110*b* may be configured to generate an authentication approval 182. In response to determining that the network element 110*a* is not authorized to be unlocked, the network element 110*b* may be configured to generate an authentication denial 184.

In one or more embodiments, the network element 110*b* may be configured to create a response message including the single use value received in the encrypted message 160*a* and the authentication approval 182 or the authentication denial 184. The response message may be encrypted into an encrypted message 160*b* using an additional private key 154. Further, the encrypted message 160*b* may be transmitted to the network element 110*a* via the communication link 125.

The encrypted message 160*b* may be decrypted at the network element 110*a* using an additional public key 156 corresponding to the additional private key 154. Herein, the network element 110*a* may confirm whether the encrypted message 160*b* includes the same single use value transmitted in the encrypted message 160*a*. In response to determining that the encrypted message 160*b* includes the same single use value transmitted in the encrypted message 160*a*, the network element 110*a* may proceed to read additional information in the encrypted message 160*b*. Herein, the network element 110*a* may be configured to determine whether the response from the network element 110*b* includes an authentication approval 182 or an authentication denial 184. In response to determining that the encrypted message 160*b* includes an authentication approval 182, the network element 110*a* may proceed to unlocking access to the local device resources 170. In response to determining that the encrypted message 160*b* includes an authentication denial 184, the network element 110*a* may proceed to maintaining access to the local device resources 170 locked. In response to determining that the encrypted message 160*b* does not include the same single use value transmitted in the encrypted message 160*a*, the network element 110*a* may determine that the network element 110*a* cannot be unlocked. The network element 110*a* may be configured to determine that the encrypted message 160*a* has been tampered prior to reception at the network element 110*a*.

At a new online stage, the server 102 may be configured to reconcile one or more ledgers to account for a number of times that the local device resources 170 were accessed.

In one or more embodiments, the private keys 154 and the public keys 156 may be preconfigured to be used a predetermined number of times over a period of time. For example, the private keys 154 and the public keys 156 may be configured for use ten times over a month. The private keys 154 and the public keys 156 may be configured to expire after a predefined period of time. For example, the private keys 154 and the public keys 156 may be configured to expire three months after a first use. The private keys 154 and the public keys 156 may be stored in secured hardware.

Although FIG. 1 illustrates a particular number of the networks 114, the users 112, the network elements 110, and the servers 102, this disclosure contemplates any suitable number of the networks 114, the users 112, the network elements 110, and the servers 102. For example, the server 102 may communicate with more than two different network elements 110. As another example, device applications 162 may include any number of services and/or applications.

Although FIG. 1 illustrates a particular arrangement of the network 114, the user 112, the network elements 110, and the server 102, this disclosure contemplates any suitable arrangement of the network 114, the user 112, the network elements 110, and the server 102. For example, the user device profiles 138 may be stored in the one or more secure databases 120 instead of the server memory 130.

Furthermore, although FIG. 1 describes and illustrates particular components, devices, or systems carrying out particular actions, this disclosure contemplates any suitable combination of any suitable components, devices, or systems carrying out any suitable actions.

FIG. 2 shows an example operational flow 200 to perform passwordless authentication operations offline, in accordance with one or more embodiments. In FIG. 2, the operational flow 200 may be performed by different components in the server 102 and/or the one or more network elements 110. In particular, the operational flow 200 may be performed using the one or more server processors 124 of the server 102 and/or one or more device processors of the one or more network elements 110. As a non-limiting example, the server 102 may be configured to verify information associated with at least one user 112 and/or one or more network elements 110. The server 102 may be configured to perform one or more operations to verify user device information 140, one or more network elements 110, and/or one or more users 112. Herein, the server 102 may be configured to perform one or more of operations 210-228. In some embodiments, while operations 210-228 are shown in a specific order, alternative arrangements may be performed such as one or more operations being performed in different sequences, in parallel, and/or omitting one or more of the operations 210-228. The operations 210-228 may cause one or more data exchanges performed between a trusted device 202 and a local service 204 and/or a secured hardware in a secured device 207. The trusted device 202 may be a device determined to be trustworthy by the server 102. The secured device 207 may be a device including multiple local device resources 170 locked behind a log in and/or multiple authentication operations.

At operation 210, the trusted device 202 is configured to provide a trusted platform module (TPM) public key and a TPM private key to the secured device 207. A TPM may be a microchip designed to provide security-related functions. The TPM may be the secured hardware 206. At operation 212, the trusted device 202 may generate a prompt in one of the authentication interfaces 180 (e.g., a screen) for the user 112 to approve or deny. At operation 214, the secured device 207 may be configured to open an authentication operation and start Bluetooth® Low Energy (BLE) scanning. At operation 216, the trusted device 202 is configured to advertise an encrypted message 160*a* using BLE. The encrypted message may include a single use value, a public key 156, and one or more device identifiers 164.

At operation 218, the secured device 207 may be configured to read the encrypted single use value (e.g., nonce) in the encrypted message 160*a*. At operation 220, the secured device 207 may be configured to decrypt the single use value using a private key 154 corresponding to the public key 156. At operation 222, the secured device 207 may be configured to transmit an encrypted response in an encrypted message 160*b* to the trusted device 202. The encrypted response may include a decrypted version of the single use value and an encrypted password, passphrase, and/or access command. The encrypted response may be encrypted using an additional public key 156.

At operation 224, the trusted device 202 may be configured to decrypt the encrypted response using an additional private key 154 that corresponds to the additional public key 156. At operation 226, the trusted device 202 may be configured to check the decrypted single use value and decrypt the password, passphrase, and/or access command. Further, the trusted device 202 may be configured to confirm the identity of the user 112 by confirming the contents of the password, passphrase, and/or access command.

At operation 228, the trusted device 202 may be configured to transmit an approval for the secured device 207.

Although this disclosure describes and illustrates particular steps in the operational flow 200 of FIG. 2 as occurring in a particular order, this disclosure contemplates any suitable steps of operational flow 200 of FIG. 2 occurring in any suitable order.

Although this disclosure describes and illustrates an example flow diagram for using a trigger and event metadata to join a meeting including the particular steps of the flow diagram of FIG. 2, this disclosure contemplates any suitable flow diagram for performing passwordless authentication operations offline including any suitable steps, which may include all, some, or none of the steps of the method of FIG. 2, where appropriate. For example, operational flow 300 may include additional steps directed to generating one or more keys.

Furthermore, although FIG. 2 describes and illustrates particular components, devices, or systems carrying out particular actions, this disclosure contemplates any suitable combination of any suitable components, devices, or systems carrying out any suitable actions.

FIG. 3 shows an example operational flow 300 to perform passwordless authentication operations offline, in accordance with one or more embodiments. In FIG. 3, the operational flow 300 may be performed by different components in the server 102 and/or the one or more network elements 110 of FIG. 1. In particular, the operational flow 300 may be performed using the one or more server processors 124 of the server 102 and/or one or more device processors of the one or more network elements 110. As a non-limiting example, the server 102 may be configured to verify information associated with at least one user 112 and/or one or more network elements 110. The server 102 may be configured to perform one or more operations to verify user device information 140, one or more network elements 110, and/or one or more users 112. Herein, the server 102 may be configured to perform one or more of operations 310-328. In some embodiments, while operations 310-328 are shown in a specific order, alternative arrangements may be performed such as one or more operations being performed in different sequences, in parallel, and/or omitting one or more of the operations 310-328. The operations 310-328 may cause one or more data exchanges performed between the trusted device 202 and the local service 204 and/or the secured hardware in a secured device

207. The trusted device 202 may be a device determined to be trustworthy by the server 102. The secured device 207 may be a device including multiple local device resources 170 locked behind a log in and/or multiple authentication operations.

At operation 310, the trusted device 202 is configured to prompt generation of an interactive trigger. The interactive trigger is shown in FIG. 3 as a quick response (QR) code. Additional embodiments of the interactive trigger may be used. These additional embodiments may include an audio signal, an image signal, and/or a combination of signals. At operation 312, the trusted device 202 may be configured to present and/or show the interactive trigger containing a transfer identifier (TXID).

At operation 314, the secured device 207 may be configured to open the local service 204. At operation 316, the secured device 207 may be configured to read the TXID by interacting with the interactive trigger and start short-range wireless scanning.

At operation 318, the trusted device 202 may be configured to advertise an encrypted message 160*a* via BLE advertising. The encrypted message may include a single use value, a public key 156, and one or more device identifiers 164. At operation 320, the secured device 207 may be configured to read the encrypted single use value (e.g., nonce) in the encrypted message 160*a*. Herein, the secured device 207 may be configured to decrypt the single use value using a private key 154 corresponding to the public key 156.

At operation 324, the secured device 207 may be configured to transmit an encrypted response in an encrypted message 160*b* to the trusted device 202. The encrypted response may include a decrypted version of the single use value and an encrypted password, passphrase, and/or access command. The encrypted response may be encrypted using an additional public key 156.

At operation 326, the trusted device 202 may be configured to decrypt the encrypted response using an additional private key 154 that corresponds to the additional public key 156. Herein, the trusted device 202 may be configured to check the decrypted single use value and decrypt the password, passphrase, and/or access command. Further, the trusted device 202 may be configured to confirm the identity of the user 112 by confirming the contents of the password, passphrase, and/or access command.

At operation 328, the trusted device 202 may be configured to transmit an approval for the secured device 207.

Although this disclosure describes and illustrates particular steps operational flow 300 of FIG. 3 as occurring in a particular order, this disclosure contemplates any suitable steps of operational flow 300 of FIG. 3 occurring in any suitable order.

Although this disclosure describes and illustrates an example flow diagram for using a trigger and event metadata to join a meeting including the particular steps of the flow diagram of FIG. 3, this disclosure contemplates any suitable flow diagram for performing passwordless authentication operations offline including any suitable steps, which may include all, some, or none of the steps of the method of FIG. 3, where appropriate. For example, operational flow 300 may include additional steps directed to generating one or more keys.

Furthermore, although FIG. 3 describes and illustrates particular components, devices, or systems carrying out particular actions, this disclosure contemplates any suitable combination of any suitable components, devices, or systems carrying out any suitable actions.

FIGS. 4A and 4B show a flowchart of process 400 to perform passwordless authentication operations offline, in accordance with one or more embodiments. Modifications, additions, or omissions may be made to the process 400 of FIGS. 4A and 4B. The process 400 of FIGS. 4A and 4B may include more, fewer, or other operations than those shown below. For example, operations may be performed in parallel or in any suitable order. While at times discussed as the server 102, the one or more network elements 110, or components of any of thereof, any suitable system or components of the system 100 of FIG. 1 may perform one or more operations of the process 400 of FIGS. 4A and 4B. For example, one or more operations 412-472 of process 400 may be implemented, at least in part, in the form of instructions 132 of FIG. 1, stored on non-transitory, tangible, machine-readable media (e.g., server memory 130 of FIG. 1) that when run by one or more processors (e.g., one or more server processors 124 of FIG. 1) may cause the one or more processors to perform operations described in operations 412-472. While the process 400 in FIGS. 4A and 4B illustrates operations 412-418 and 450-472 as being performed by a network element 110 acting as an offline device 402 and operations 420-444 as being performed by an additional network element 110 acting as an authentication system 404, less or more operations may be performed in any of the device elements and/or components shown in the system 100 of FIG. 1.

The process 400 starts at operation 412, where the offline device 402 is configured to establish a communication link 125 with an authentication system 404. The communication link 125 may be a short-range wireless communication link between the offline device 402 and the authentication system 404. At operation 414, the offline device 402 may be configured to generate an encrypted message 160 including a single use value, an offline device identifier, and an authentication system identifier. At operation 416, sign, using a first public key 156, the encrypted message 160. At operation 418, the offline device 402 may be configured to transmit the encrypted message 160 to the authentication system 404.

The process 400 may transition from the offline device 402 to the authentication system 404. At operation 420, the authentication system 404 receive encrypted message 160 from the offline device 402. Herein, the authentication system 404 may be configured to receive, via the short-range wireless communication link 125, the encrypted message 160 from the offline device 402. The encrypted message 160 may be a request to unlock the offline device 402. The encrypted message 160 may include a single use value configured to identify an authentication attempt concatenated with a network element identifier associated with the authentication system 404 and a device identifier associated with the offline device 402. The encrypted message 160 may be encrypted using a first public key 156 at the offline device 402. At operation 422, the authentication system 404 decrypt the encrypted message 160 using a first private key 154 corresponding to the first public key 156. At operation 424, the authentication system 404 extract the single use value and device identifiers 164 from encrypted message 160. The single use value may be read as encrypted and/or after the single use is encrypted. At operation 426, the authentication system 404 determines whether an authentication attempt is approved or denied.

The process 400 continues at operation 430, where the authentication system 404 determines whether the request includes an approved authentication attempt. The authentication system 404 may determine that the request is approved if the offline device 402 is previously approved to communicate with the authentication system 404. Further, the authentication system 404 may be configured to determine that the request is approved if the server 102 previously acknowledged the authentication system 404 as a system to perform passwordless authentication process offline for the offline device 402. If the authentication system 404 authenticates the access request from the offline device 402 (e.g., YES), the process 400 continues to operation 432. At operation 432, the authentication system 404 may be configured to generate authentication approval 182 including the single use value and an approval message. The authentication system 404 may be configured to generate the authentication approval 182 to include the single use value and the approval message configured to unlock the offline device 402. At operation 434, the authentication system 404 may be configured to encrypt the authentication approval 182 using a second private key 154. At operation 436, the authentication system 404 may be configured to transmit encrypted authentication approval 182 to the offline device 402. The authentication system 404 may be configured to transmit, via the short-range wireless communication link 125, an encrypted version of the authentication approval 182 to the offline device 402. The encrypted version of the authentication approval 182 may be configured to be decrypted using a second private key 154 corresponding to the second public key 156. The offline device 402 may be configured to unlock in response to successfully decrypting the authentication approval 182. If the authentication system 404 does not authenticate the access request from the offline device 402 (e.g., NO), the process 400 continues to operation 442. At operation 442, the authentication system 404 may be configured to generate authentication denial 184. In response to determining that the additional authentication attempt is not approved, the authentication system 404 may be configured to generate an authentication denial configured to maintain the offline device 402 locked. At operation 444, the authentication system 404 may be configured to transmit authentication denial 184 to the offline device 402. The authentication system 404 may be configured to transmit, via the short-range wireless communication link 125, the authentication denial 184 to the offline device 402. The offline device 402 may be configured to remain locked in response to receiving the authentication denial 184.

The process 400 may transition from the authentication system 404 to the offline device 402. At operation 450, the offline device 402 may be configured to receive encrypted authentication approval 182 from the authentication system 404. At operation 452, the offline device 402 may be configured to decrypt the encrypted authentication approval 182 using a second private key 154 corresponding to the second public key 156.

The process 400 continues at operation 460, where the offline device 402 determines whether the decrypted response message includes the same single use value. If the offline device 402 determines that the decrypted response message does not include the same single use value (e.g., NO), the process 400 continues to operation 462. At operation 462, the offline device 402 may be configured to block access between networked local device resources 170 and the offline device 402. If the offline device 402 determines that the decrypted response message includes the same single use value (e.g., YES), the process 400 continues to operation 472. At operation 472, the offline device 402 may be configured to grant access between networked local device resources 170 and the offline device 402. The process 400 may end at operation 462 or operation 472.

In one or more embodiments, the first private key 154 is unique to the authentication system 404 (e.g., a specific network element 110). The second private key 154 may be unique to the offline device 402. The single use value may be included in an electronic nonce. The single use value may be included in an electronic token. The offline device 402 may be configured to unlock in response to successfully decrypting the authentication approval 182 and determine that the authentication approval 182 includes the single use value. The short-range wireless communication link 125 may be established using a wireless low-energy technology that allows the authentication system 404 and the offline device 402 to communicate with each other over a short distance using short-wavelength radio waves (e.g., BLE). The authentication system 404 and the offline device 402 may be only communicatively coupled to one another.

Although this disclosure describes and illustrates particular steps in the process 400 of FIGS. 4A and 4B as occurring in a particular order, this disclosure contemplates any suitable steps of the process 400 of FIGS. 4A and 4B occurring in any suitable order. Although this disclosure describes and illustrates an example method for performing passwordless authentication operations offline including the particular steps of the process 400 of FIGS. 4A and 4B, this disclosure contemplates any suitable method for performing passwordless authentication operations offline including any suitable steps, which may include all, some, or none of the steps of the process 400 of FIGS. 4A and 4B, where appropriate. Furthermore, although FIGS. 4A and 4B describes and illustrates particular components, devices, or systems carrying out particular actions, this disclosure contemplates any suitable combination of any suitable components, devices, or systems carrying out any suitable actions.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example, and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an I/O interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example, and not by way of limitation, to execute instructions, processor 502 may retrieve (or fetch) the instructions from an internal register, an internal cache, processor 502, or storage 506; decode and execute them; and then write one or more results to an internal register, an internal cache, processor 502, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to processor 502 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, processor 502 includes main memory for storing instructions for processor 502 to execute or data for processor 502 to operate on. As an example, and not by way of limitation, computer system 500 may load instructions from storage 506 or another source (such as, for example, another computer system 500) to processor 502. Processor 502 may then load the instructions from processor 502 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to processor 502. In particular embodiments, processor 502 executes only instructions in one or more internal registers or internal caches or in memory 504 (as opposed to storage 506 or elsewhere) and operates only on data in one or more internal registers or internal caches or in processor 502 (as opposed to storage 406 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a solid-state drive (SSD), a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 406 may include one or more storages 406. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 510 for it. As an example, and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may include non-transitory computer-readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may include a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A network element, comprising:

one or more processors; and one or more computer-readable non-transitory storage media coupled to the one or more processors and comprising instructions that, when executed by the one or more processors, cause the network element to perform operations comprising:

establishing a short-range wireless communication link with an offline device;

receiving, via the short-range wireless communication link, an encrypted message from the offline device, wherein:

the encrypted message is a request to unlock the offline device;

the encrypted message comprises a single use value configured to identify an authentication attempt concatenated with a network element identifier associated with the network element and a device identifier associated with the offline device; and the encrypted message is encrypted using a first public key at the offline device;

decrypting, using a first private key corresponding to the first public key, the encrypted message;

determining whether the authentication attempt is approved;

in response to determining that the authentication attempt is approved, generating an authentication approval including the single use value and an approval message configured to unlock the offline device;

encrypting, using a second public key, the authentication approval; and transmitting, via the short-range wireless communication link, an encrypted version of the authentication approval to the offline device, wherein:

the encrypted version of the authentication approval is configured to be decrypted using a second private key corresponding to the second public key; and the offline device is configured to unlock in response to successfully decrypting the authentication approval.

2. The network element of claim 1, wherein:

the first private key is unique to the network element; and the second private key is unique to the offline device.

3. The network element of claim 1, wherein:

the single use value is comprised in an electronic nonce.

4. The network element of claim 1, wherein:

the single use value is comprised in an electronic token.

5. The network element of claim 1, wherein:

the offline device is configured to unlock in response to successfully decrypting the authentication approval and determining that the authentication approval comprises the single use value.

6. The network element of claim 1, wherein:

the short-range wireless communication link is established using a wireless low-energy technology that allows the network element and the offline device to communicate with each other over a short distance using short-wavelength radio waves.

7. The network element of claim 1, wherein:

the network element and the offline device are only communicatively coupled to one another.

8. The network element of claim 1, wherein the instructions further cause the network element to perform additional operations comprising:

establishing an additional short-range wireless communication link with an additional offline device;

receiving, via the additional short-range wireless communication link, an additional encrypted message from the additional offline device, wherein:

the additional encrypted message is an additional request to unlock the offline device;

the additional encrypted message comprises an additional single use value configured to identify an additional authentication attempt concatenated with the network element identifier associated with the network element and an additional device identifier associated with the additional offline device; and the additional encrypted message is encrypted using a third public key at the additional offline device;

decrypting, using a third private key corresponding to the third public key, the additional encrypted message;

determining whether the additional authentication attempt is approved;

in response to determining that the additional authentication attempt is not approved, generating an authentication denial configured to maintain the offline device locked; and transmitting, via the additional short-range wireless communication link, the authentication denial to the offline device, the offline device being configured to remain locked in response to receiving the authentication denial.

9. A method performed by a network element, comprising:

establishing a short-range wireless communication link with an offline device;

receiving, via the short-range wireless communication link, an encrypted message from the offline device, wherein:

the encrypted message is a request to unlock the offline device;

the encrypted message comprises a single use value configured to identify an authentication attempt concatenated with a network element identifier associated with the network element and a device identifier associated with the offline device; and the encrypted message is encrypted using a first public key at the offline device;

decrypting, using a first private key corresponding to the first public key, the encrypted message;

determining whether the authentication attempt is approved;

in response to determining that the authentication attempt is approved, generating an authentication approval including the single use value and an approval message configured to unlock the offline device;

encrypting, using a second public key, the authentication approval; and transmitting, via the short-range wireless communication link, an encrypted version of the authentication approval to the offline device, wherein:

the encrypted version of the authentication approval is configured to be decrypted using a second private key corresponding to the second public key; and the offline device is configured to unlock in response to successfully decrypting the authentication approval.

10. The method of claim 9, wherein:

the first private key is unique to the network element; and the second private key is unique to the offline device.

11. The method of claim 9, wherein:

the single use value is comprised in an electronic nonce.

12. The method of claim 9, wherein:

the single use value is comprised in an electronic token.

13. The method of claim 9, wherein:

the offline device is configured to unlock in response to successfully decrypting the authentication approval and determining that the authentication approval comprises the single use value.

14. The method of claim 9, wherein:

the short-range wireless communication link is established using a wireless low-energy technology that allows the network element and the offline device to communicate with each other over a short distance using short-wavelength radio waves.

15. A non-transitory computer-readable medium storing instructions in a network element that, when executed by a processor, cause the processor to:

establish a short-range wireless communication link with an offline device;

receive, via the short-range wireless communication link, an encrypted message from the offline device, wherein:

the encrypted message is a request to unlock the offline device;

the encrypted message comprises a single use value configured to identify an authentication attempt concatenated with a network element identifier associated with the network element and a device identifier associated with the offline device; and the encrypted message is encrypted using a first public key at the offline device;

decrypt, using a first private key corresponding to the first public key, the encrypted message;

determine whether the authentication attempt is approved;

in response to determining that the authentication attempt is approved, generating an authentication approval including the single use value and an approval message configured to unlock the offline device;

encrypt, using a second public key, the authentication approval; and transmit, via the short-range wireless communication link, an encrypted version of the authentication approval to the offline device, wherein:

the encrypted version of the authentication approval is configured to be decrypted using a second private key corresponding to the second public key; and the offline device is configured to unlock in response to successfully decrypting the authentication approval.

16. The non-transitory computer-readable medium of claim 15, wherein:

the first private key is unique to the network element; and the second private key is unique to the offline device.

17. The non-transitory computer-readable medium of claim 15, wherein:

the single use value is comprised in an electronic nonce.

18. The non-transitory computer-readable medium of claim 15, wherein:

the single use value is comprised in an electronic token.

19. The non-transitory computer-readable medium of claim 15, wherein:

the offline device is configured to unlock in response to successfully decrypting the authentication approval and determining that the authentication approval comprises the single use value.

20. The non-transitory computer-readable medium of claim 15, wherein:

the short-range wireless communication link is established using a wireless low-energy technology that allows the network element and the offline device to communicate with each other over a short distance using short-wavelength radio waves.

* * * * *